US 11,729,649 B2

(12) United States Patent
Chen et al.

(10) Patent No.: US 11,729,649 B2
(45) Date of Patent: Aug. 15, 2023

(54) PERIODIC UNSOLICITED WIRELESS LINK MEASUREMENT REPORT

(71) Applicant: Intel Corporation, Santa Clara, CA (US)

(72) Inventors: Cheng Chen, Hillsboro, OR (US); Carlos Cordeiro, Portland, OR (US); Oren Kedem, Modiin Maccabim-Reut (IL); Claudio Da Silva, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 16/436,277

(22) Filed: Jun. 10, 2019

(65) Prior Publication Data

US 2019/0297518 A1    Sep. 26, 2019

Related U.S. Application Data

(60) Provisional application No. 62/783,471, filed on Dec. 21, 2018, provisional application No. 62/723,733, (Continued)

(51) Int. Cl.
*H04W 24/10* (2009.01)
*H04W 72/04* (2023.01)

(52) U.S. Cl.
CPC ........... *H04W 24/10* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 2005/0009565 A1* | 1/2005 | Kwak | H04W 24/10 455/562.1 |
| 2006/0218271 A1* | 9/2006 | Kasslin | H04L 43/06 709/224 |

(Continued)

FOREIGN PATENT DOCUMENTS

| | | | | |
|---|---|---|---|---|
| CN | 104115521 A | * | 10/2014 | .......... H04L 5/0037 |
| CN | 105027157 A | * | 11/2015 | .......... E02F 9/2054 |
| CN | 102948197 B | * | 6/2017 | .......... H04B 7/0417 |

OTHER PUBLICATIONS

"Part 11: Wireless LAN Medium Access Control (MAC) and Physical Layer (PHY) Specifications", IEEE Computer Society Std 802.11 2016 (Revision of IEEE Std 802.11-2012) Part 1 of 2, (2016), 1800 pgs.

(Continued)

*Primary Examiner* — Noel R Beharry
*Assistant Examiner* — Rodrick Mak
(74) *Attorney, Agent, or Firm* — Schwegman Lundberg & Woessner, P.A.

(57) ABSTRACT

Apparatuses, methods, and computer readable media for periodic unsolicited wireless link measurement reporting. The apparatus comprising processing circuitry configured to: decode a link measurement request frame received from a requesting STA, the link measurement request frame comprising a report start time subfield, a report interval time subfield, and a report count subfield. The processing circuitry further configured to determine link measurements based on the link measurement request frame or based on a last frame received from the requesting STA within a reporting interval, the reporting interval indicated by the report start time subfield and the report interval time subfield. The processing circuitry further configured to encode a link measurement report frame to comprise the link measure- (Continued)

ments and configure the STA to transmit the link measurement report frame before an end of the reporting interval.

19 Claims, 14 Drawing Sheets

Related U.S. Application Data filed on Aug. 28, 2018, provisional application No. 62/685,501, filed on Jun. 15, 2018.

(56) References Cited

U.S. PATENT DOCUMENTS

| | | | |
|---|---|---|---|
| 2007/0002757 A1* | 1/2007 | Soomro | H04W 24/10 370/252 |
| 2007/0036170 A1* | 2/2007 | Gonikberg | H04W 88/06 370/431 |
| 2007/0168326 A1* | 7/2007 | Das | H04L 1/0006 |
| 2010/0279679 A1* | 11/2010 | Young | H04W 36/0085 455/423 |
| 2011/0069650 A1* | 3/2011 | Singh | H04W 52/0206 370/311 |
| 2013/0010844 A1* | 1/2013 | Amini | H04L 1/0036 375/219 |
| 2016/0070341 A1* | 3/2016 | Zhang | G06F 3/017 345/156 |
| 2016/0080958 A1* | 3/2016 | Rinne | H04W 24/10 370/338 |
| 2016/0218673 A1* | 7/2016 | Anderson | H04B 7/0413 |
| 2016/0345345 A1* | 11/2016 | Malik | H04W 16/14 |
| 2017/0202017 A1* | 7/2017 | Zhou | H04B 7/0452 |
| 2018/0206139 A1* | 7/2018 | Wang | H04B 7/2606 |
| 2019/0341973 A1* | 11/2019 | Kasher | H04B 7/0417 |
| 2019/0380017 A1* | 12/2019 | Thangarasa | H04W 4/70 |

OTHER PUBLICATIONS

"Part 11: Wireless LAN Medium Access Control (MAC) and Physical Layer (PHY) Specifications", IEEE Computer Society Std 802.11 2016 (Revision of IEEE Std 802.11-2012) Part 2 of 2, (2016), 1734 pgs.

"P802.11a TM/D7.0", Draft Standard for Information Technology—6 Telecommunications and Information Exchange 7 Between Systems—Local and Metropolitan Area 8 Networks—Specific Requirements—Part 11, (2020), 784 pgs.

* cited by examiner

PERIODIC UNSOLICITED WIRELESS LINK MEASUREMENT REPORT

PRIORITY CLAIM

This application claims the benefit of priority under 35 USC 119(e) to U.S. Provisional Patent Application Ser. No. 62/685,501, filed Jun. 15, 2018, U.S. Provisional Patent Application Ser. No. 62/723,733, filed Aug. 28, 2018, U.S. Provisional Patent Application Ser. No. 62/783,471, filed Dec. 21, 2018, all three of which are incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ad and/or IEEE 802.11ay. Some embodiments relate to methods, computer readable media, and apparatus for periodic unsolicited wireless link measurement reports for directional multi-gigabit (DMG) or enhanced DMG (EDMG) packets (e.g., a physical layer convergence protocol (PLCP) protocol data unit (PPDU)).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 7 illustrates a block diagram of an example wireless device upon which any one or more of the techniques (e.g., methodologies or operations) discussed herein may perform;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
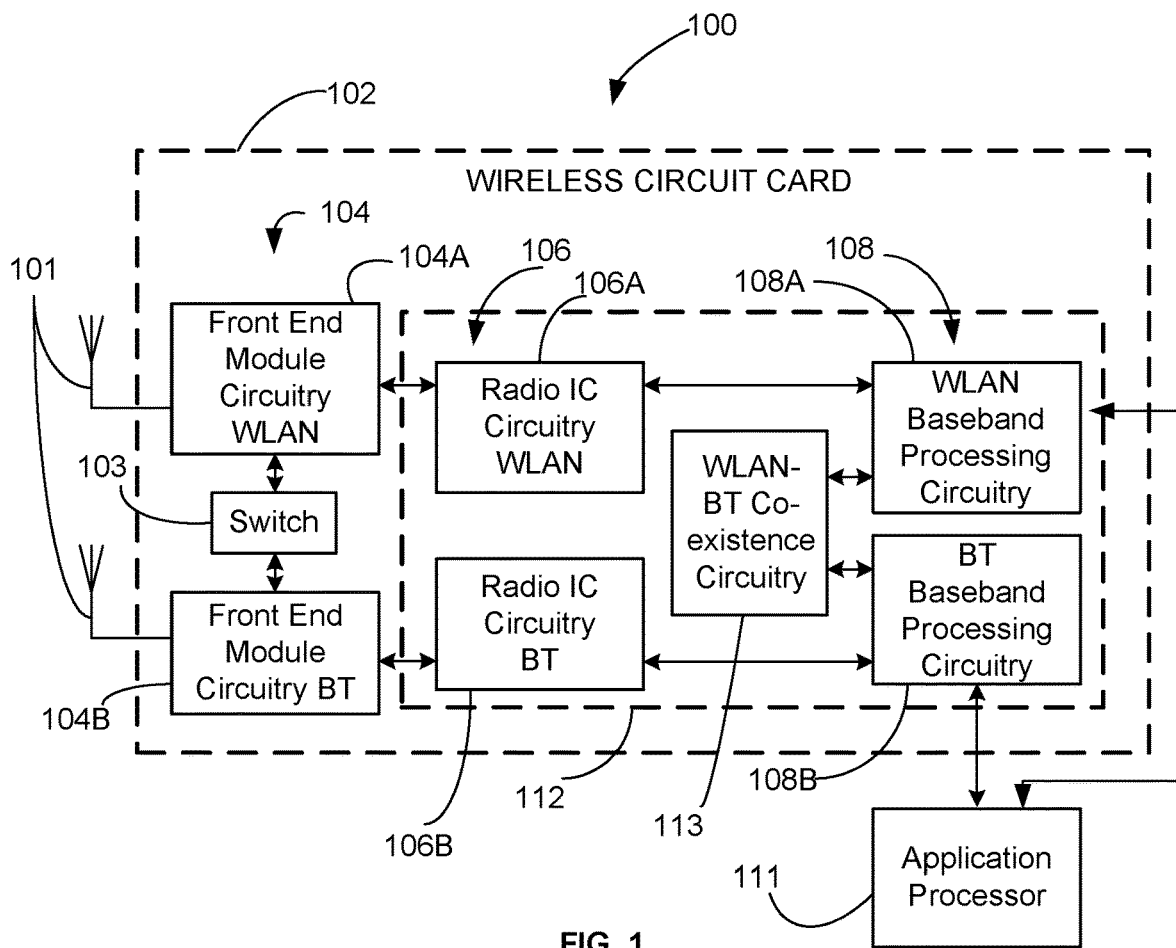
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, IEEE 802.11ax, IEEE 802.11ad, IEEE 802.11ay, and/or WiGig standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however. In some embodiments, a 2.16 GHz channel may be used. In some embodiments, there may be a primary 2.16 GHz channel and one or more secondary 2.16 GHz channels. In some embodiments, one or more of the 2.16 GHz channels that are adjacent may be bonded together.

Figure 2:
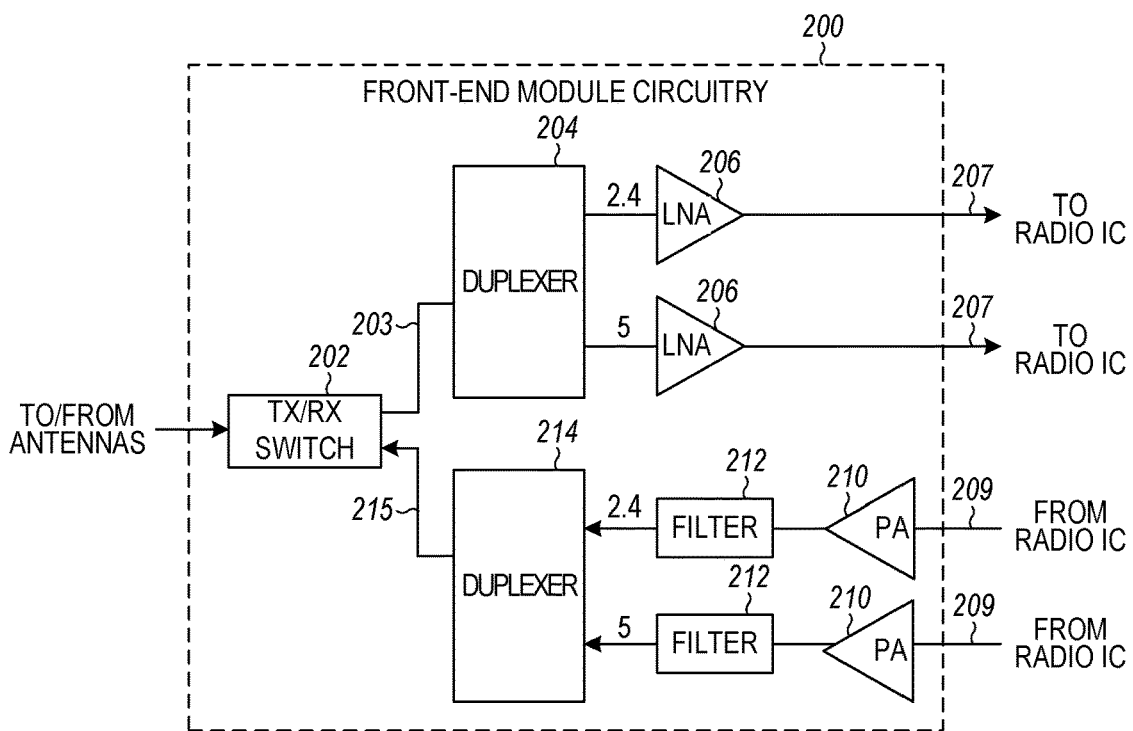
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum, the 5 GHz frequency spectrum, or the 60 GHz spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
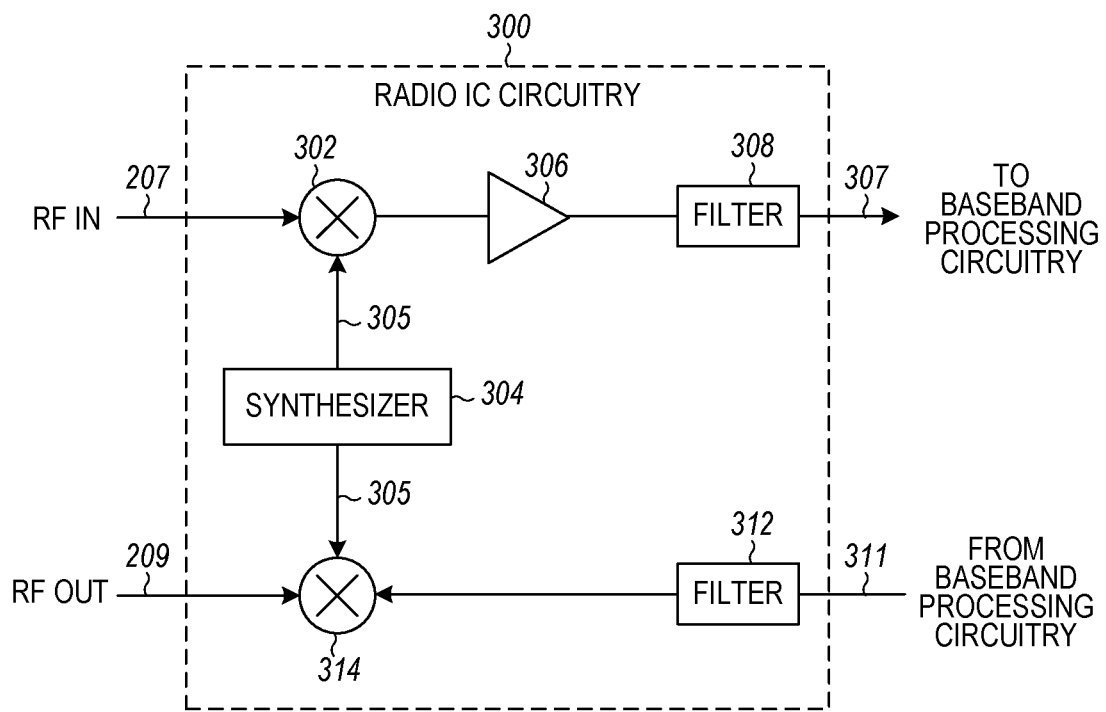
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
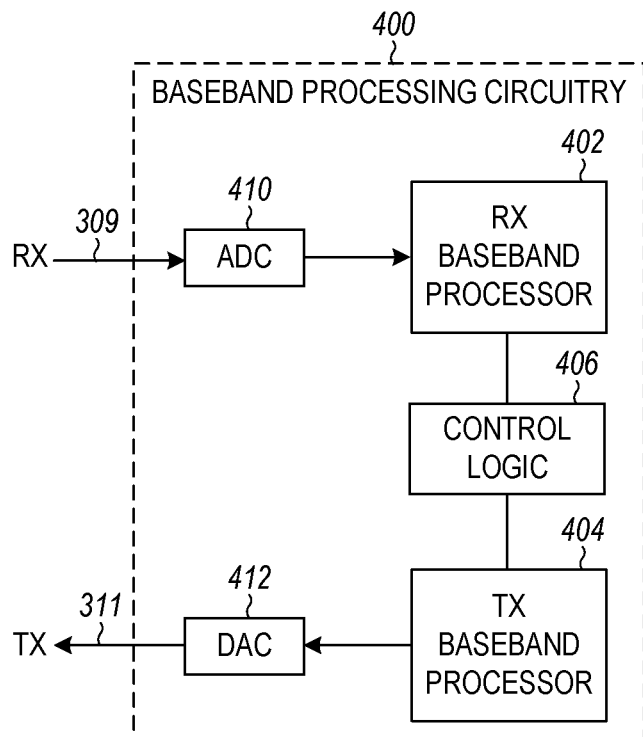
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
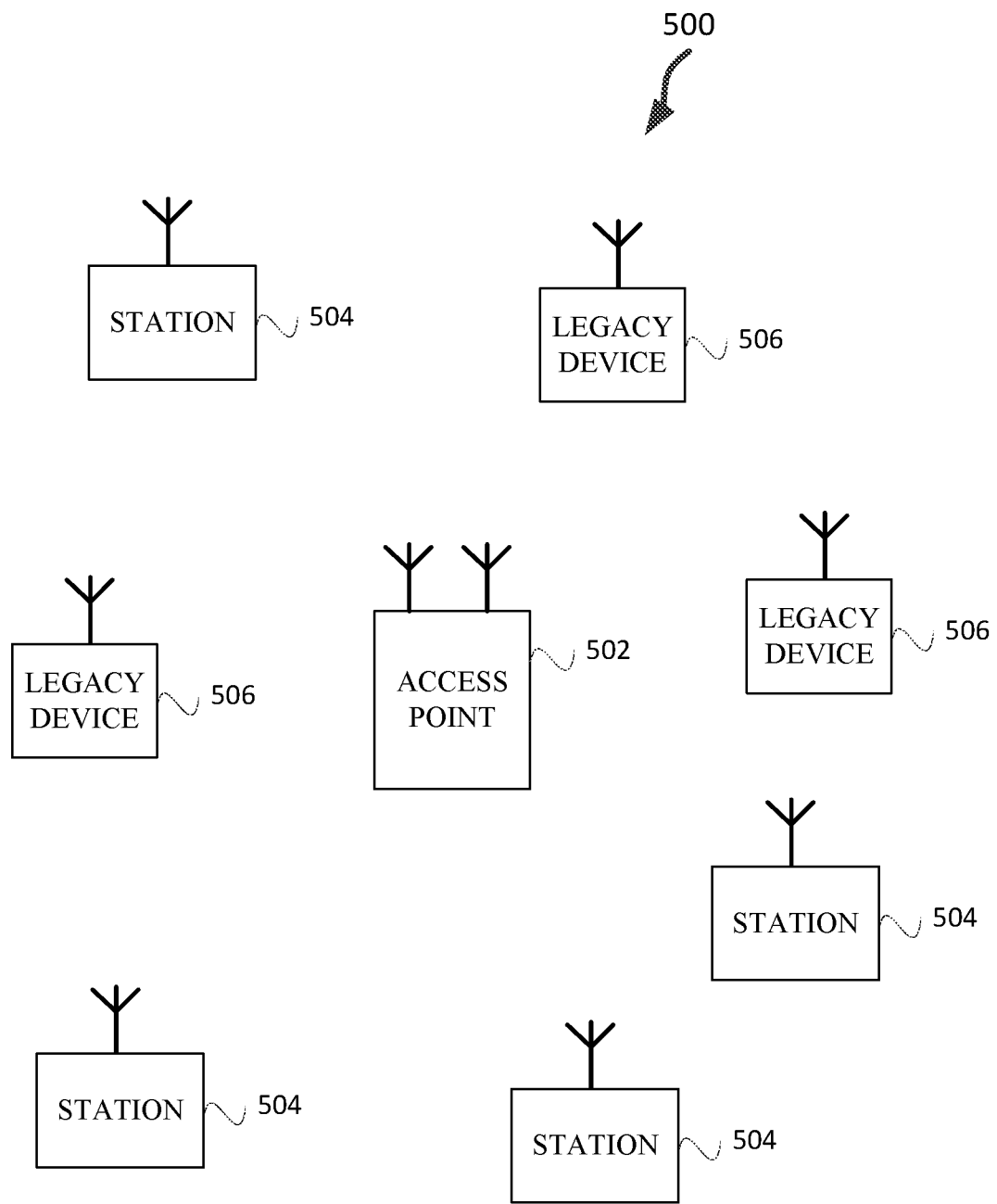
FIG. 5 illustrates a WLAN in accordance with some embodiments.

FIG. 5 illustrates a WLAN 500 in accordance with some embodiments. The WLAN may comprise a basis service set (BSS) or personal BSS (PBSS) 500 that may include a access point (AP) 502, which may be an AP or a station acting as a PBSS control point (PCP), stations 504 (e.g., IEEE 802.11ay), and legacy devices 506 (e.g., IEEE 802.11n/ac/ad). In some embodiments, the access point 502 and/or stations 504 may be an enhanced DMG (EDMG) access point or EDMG stations, respectively. In some embodiments, the legacy devices 506 may be devices.

The AP 502 may be an AP configured to transmit and receive in accordance with one or more IEEE 802.11 communication protocols, IEEE 802.11ax or IEEE 802.11ay. In some embodiments, the access point 502 is a base station. The access point 502 may be part of a PBSS. The access point 502 may use other communications protocols as well as the IEEE 802.11 protocol. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include code division multiple access (CDMA), space-division multiple access (SDMA), multiple-input multiple-output (MIMO), multi-user (MU) MIMO (MU-MIMO), and/or single-input single-output (SISO). The access point 502 and/or station 504 may be configured to operate in accordance with Next Generation 60 (NG60), WiFi Gigabyte (WiGiG), and/or IEEE 802.11ay.

The legacy devices 506 may operate in accordance with one or more of IEEE 802.11 a/b/g/n/ac/ad/af/ah/aj, or another legacy wireless communication standard. The legacy devices 506 may be IEEE 802 stations. The stations 504 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay/ax or another wireless protocol. The stations 504 and/or access point 502 may be attached to a BSS and may also operate in accordance with IEEE 802.11ay where one of the stations 504 and/or access point 502 takes the role of the PCP. The access point 502 may be a station 504 taking the role of the PCP.

The access point 502 may communicate with legacy devices 506 in accordance with legacy IEEE 802.11 communication techniques. In example embodiments, the access point 502 may also be configured to communicate with stations 504 in accordance with legacy IEEE 802.11 communication techniques. The access point 502 may use techniques of 802.11ad for communication with legacy devices 106. The access point 502 and/or stations 504 may be a personal basic service set (PBSS) Control Point (PCP) which can be equipped with large aperture antenna array or Modular Antenna Array (MAA).

The access point 502 and/or stations 504 may be equipped with more than one antenna. Each of the antennas of access point 502 and/or stations 504 may be a phased array antenna with many elements. In some embodiments, an IEEE 802.11ay frame may be configurable to have the same bandwidth as a channel. In some embodiments, the access point 502 and/or stations 504 may be equipped with one or more directional multi-gigabit (DMG) antennas or enhanced DMG (EDMG) antennas, which may include multiple radio-frequency base band (RF-BB) chains. The access point 502 and/or stations 504 may be configured to perform beamforming and may have an antenna weight vector (AWV) associated with one or more antennas. In some embodiments, the AP 502 and/or stations 504 may be a EDMG AP 502 or EDMG station 504, respectively. In some embodiments, the access point 502 and/or STA 504 may transmit a frame, e.g., a PPDU.

An IEEE 802.11ay frame may be configured for transmitting a number of spatial streams, which may be in accordance with MU-MIMO. In other embodiments, the AP 502, stations 504, and/or legacy devices 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies. In some embodiments, the AP 502 and/or stations 504 may be configured to implement more than one communications protocols, which may be collocated in the same device. The two or more communications protocols may use common or separate components to implement the communications protocols.

In accordance with some IEEE 802.11ay embodiments, an AP 502 may be arranged to contend for a wireless medium (e.g., during a contention period) to receive exclusive control of the medium, which may be termed a transmission opportunity (TxOP) for performing beamforming training for a multiple access technique such as OFDMA or MU-MIMO. In some embodiments, the multiple-access technique used during a TxOP may be a scheduled OFDMA technique, although this is not a requirement. In some embodiments, the multiple access technique may be a space-division multiple access (SDMA) technique. The AP 502 may communicate with legacy stations 506 and/or stations 504 in accordance with legacy IEEE 802.11 communication techniques.

In example embodiments, the radio architecture of FIG. 5, the front-end module circuitry of FIG. 2, the radio IC circuitry of FIG. 3, and/or the base-band processing circuitry of FIG. 4 may be configured to perform the methods and functions herein described in conjunction with FIGS. 1-19.

In example embodiments, the stations 504, an apparatus of the stations 504, the access point 502, and/or an apparatus of an access point 502, may include one or more of the following: the radio architecture of FIG. 1, the front-end module circuitry of FIG. 2, the radio IC circuitry of FIG. 3, and/or the base-band processing circuitry of FIG. 4.

In example embodiments, the stations 504, apparatuses of the stations 504, the access points 502, and/or apparatuses of the access point 502, are configured to perform the methods and functions described herein in conjunction with FIGS. 1-19. The term Wi-Fi may refer to one or more of the IEEE 802.11 communication standards. AP may refer to an access point 502. STA may refer to a station 504 and/or a legacy device 506.

Figure 6:
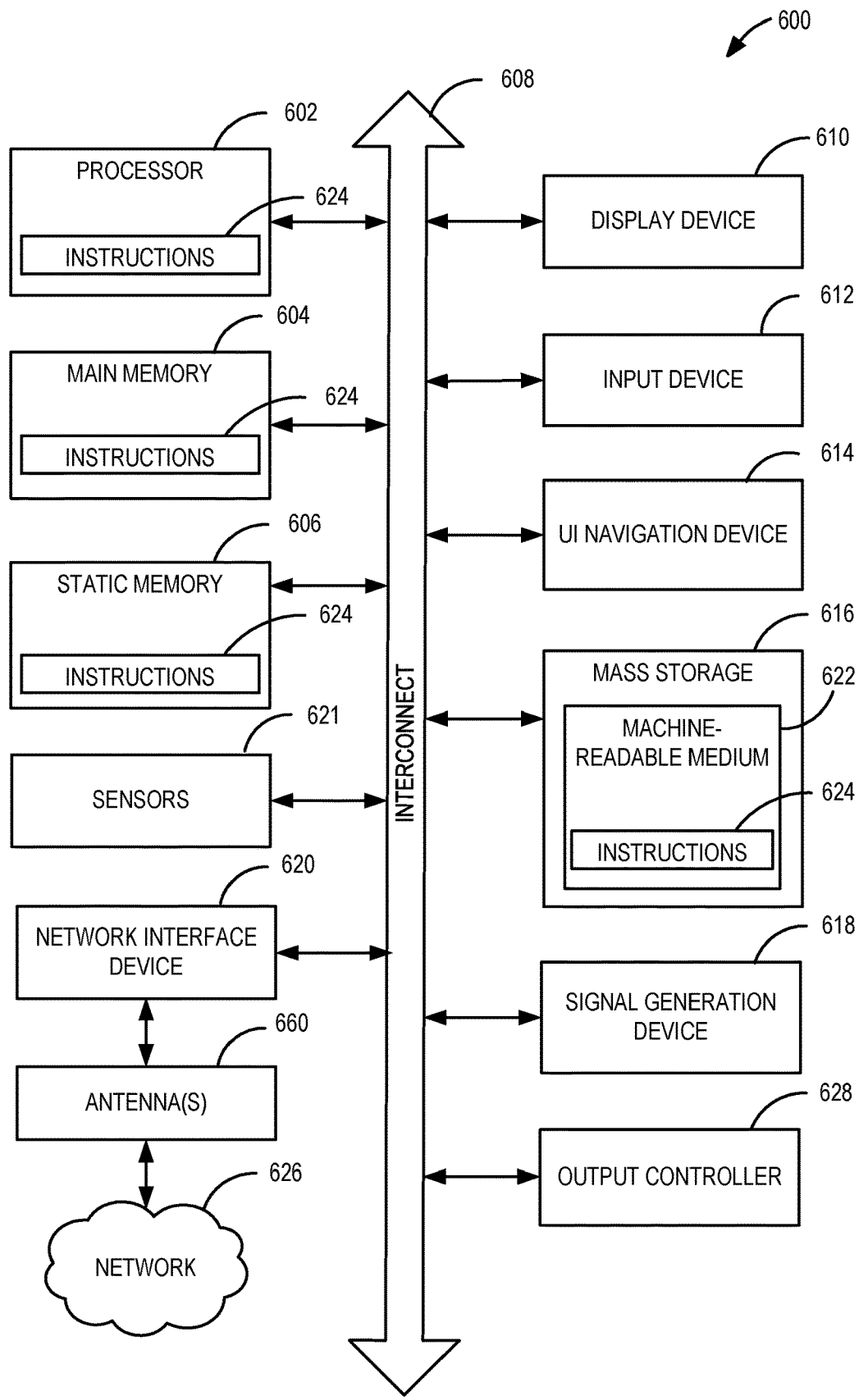
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a access point 502, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise one or more of physical layer circuitry, MAC layer circuitry, processing circuitry, and/or transceiver circuitry. In some embodiments, the processing circuitry may include one or more of the processor 602, the instructions 624, physical layer circuitry, MAC layer circuitry, and/or transceiver circuitry. The processor 602, instructions 624, physical layer circuitry, MAC layer circuity, processing circuitry, and/or transceiver circuitry may be configured to perform one or more of the methods and/or operations disclosed herein.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

In some embodiments, an apparatus used by the station 500 may include various components of the station 504 as shown in FIG. 5 and/or the example machines 100, 200, 300, or 600. Accordingly, techniques and operations described herein that refer to the station 504 may be applicable to an apparatus of the station 504, in some embodiments. It should also be noted that in some embodiments, an apparatus used by the AP 502 may include various components of the AP 502 as shown in FIG. 5 and/or the example machine 100, 200, 300, or 600. Accordingly, techniques and operations described herein that refer to the AP 502 may be applicable to an apparatus for an AP, in some embodiments.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware. Accordingly, apparatuses, devices, and operations described herein that refer to the station 504 and/or AP 502 may be applicable to an apparatus for the station 504 and/or AP 502.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.6.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
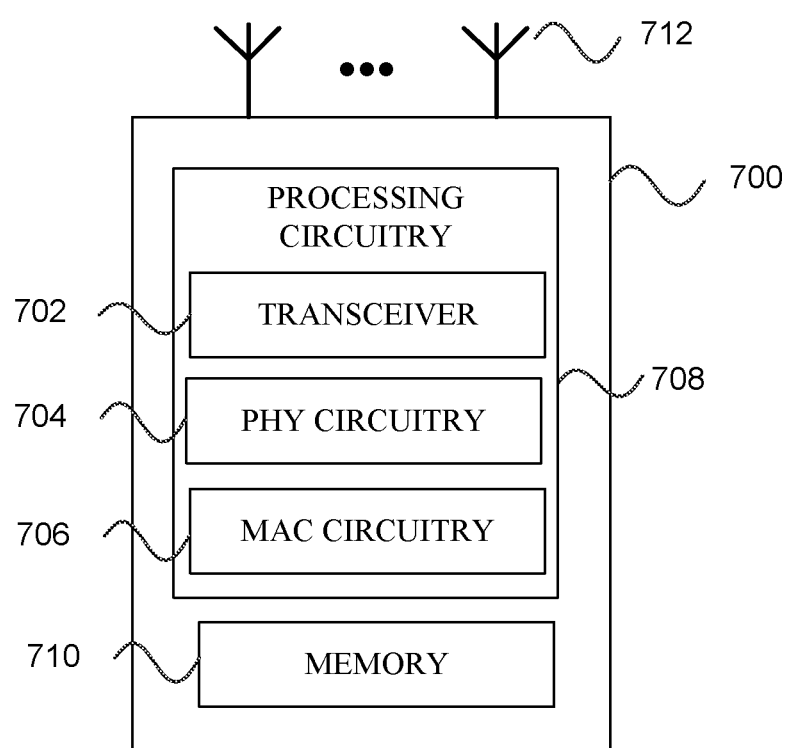
FIG. 7 illustrates a block diagram of an example wireless device 700 upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments, the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general-purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Link adaptation protocol for DMG devices is part of a communication standard, e.g., IEEE 802.11ad. An initiator (e.g., AP 502) transmits a Link Measurement Request frame to the responder (e.g., STA 504) requesting the responder to conduct link measurement and report the feedback. The responder, after receiving the Link Measurement Request frame, shall do the measurement, and then send back a Link Measurement Report frame containing the measurement results. Some embodiments of link adaptation protocols require the use of paired Link Measurement Request and Link Measurement Report frame. However, in some scenarios, for example, in mmWave distribution networks where TDD devices are dominant, periodic link measurement report is needed to enable fast link adaptation between initiator and responder. In these cases, the initiator also has to send periodic Link Measurement Request frames to solicit the Link Measurement Report frames. Some embodiments do not require sending Link Measurement Request frame for each Link Measurement Report frame, where sending a Link Measurement Request frame for each Link Measurement Report frame significantly increases management overhead if periodic link measurement report is required. Some embodiments where a Link Measurement Request frame is sent for each Link Measurement Report frame are susceptible to the loss of Link Measurement Request frame. That is, if a Link Measurement request frame is missing, the initiator has to retransmit it, and therefore interrupting the periodic report. In some embodiments, when the initiator receives the Link Measurement Report frame, it does not know when the responder starts measurement that is associated with the report.

Some embodiments disclosure DMG link adaptation protocols. Some embodiments enable periodic and unsolicited link measurement report for DMG STAs where the initiator does not need to send multiple Link Measurement Request frame for period link measurement report. Some embodiments include a new field "Periodic Report" in Link Measurement Request frame to enable periodic and unsolicited link measurement report. Some embodiments include a new field "Measurement Start Time" field in Link Measurement Report frame to indicate the time when the responder started the measurement associated with the measurement report contained in the corresponding Link Measurement Report frame. Some embodiments disclose a method for unsolicited link measurement report, which may reduce the management overhead when periodic link measurement report is used. In some embodiments, when the initiator receives the Link Measurement Report frame sent by the responder, the initiator will be able to know when the responder started the measurement that leads to the measurement report. Some embodiments enable periodic and unsolicited link measurement reports for DMG STAs by introducing a new field "Periodic Report" in Link Measurement Request frame. In some embodiments, Non-DMG devices will ignore one or more of the new fields. In some embodiments, a new field indicates the frequency with which the responder needs to send unsolicited reports back to the initiator, as well as the duration during which the responder is expected to send the reports periodically. In some embodiments, the responder will send Link Measurement Report frames periodically without the need of additional Link Measurement Request frames. In some embodiments, the initiator can signal the initiation of unlimited periodic measurement report, as well as the ending of periodic measurement report.

In some embodiments, the Report Duration subfield indicates the total periodic reporting interval. In some embodiments, a subfield of Reporting Start Time to indicate when to begin the periodic reporting is included in the link measurement request frame. In some embodiments, the Link Measurement Report frame, includes a Measurement Start Time field to Report Interval Start Time field, and a Last Reset Time Offset field to indicate the last reset time since start of the corresponding reporting interval. In some embodiments, the Reporting Count subfield indicates the total number of reporting intervals, which may be represented in 1 octet or less. In some embodiments, the Measurement Start Time subfield indicates the arrival time of the first PPDU within the corresponding reporting interval as the start of the measurement. In some embodiments, with reset conditions, arrival time of this PPDU offers no information useful to link adaptation where statistics are zeroed at reset conditions. In some embodiments, Last Reset Time is included which indicates information about some reset conditions, such as packet queueing (local to transmitter), or channel access in CSMA case, packet loss etc. Some embodiments include a Reporting Start Time subfield which indicates the lower 4 octets of the timing synchronization function (TSF) timer at the start of the first reporting interval.

In accordance with some embodiments, the Reporting Interval subfield indicates the interval of time, in microseconds, at which the responding STA needs to take measurements and send an unsolicited Link Measurement Report frame to the requesting STA. The Reporting Count subfield indicates the number of reporting intervals, during which time the responding STA needs to send unsolicited Link Measurement Report frames periodically to the requesting STA for every reporting interval. The Last Reset Time Offset field indicates the relative time offset, in microseconds, of the last reset time since the start of the corresponding reporting interval. The Report Interval Start Time field indicates the lower 4 octets of the TSF timer at the start of the report interval of the corresponding Link Measurement Report frame.

In some embodiments adding optional fields are directly appended to the end of existing Link Measurement Request and Link Measurement Report frames. Directly adding optional fields to existing frames may cause some issues in terms of interpreting the added optional field. For example, directly adding optional fields to existing Link Measurement Report frame, e.g., the last three fields are newly added for periodic link measurement and are optionally present. When a DMG STA (e.g., legacy device 506, STA 504, AP 502) receives a Link Measurement Report frame and decodes the frame after a RSNI field, it will not be able to know whether the remaining bits are corresponding to the optional DMG Link Margin or DMG Link Adaptation Acknowledge element, or corresponding to the optional Periodic Report Control, Report Interval Start Time, and Statistics Reset Time Offset fields.

In some embodiments, instead of directly adding new optional fields to the end of Link Measurement Request/ Report frame 900, 1000, and the fields are combined as an optional information element. Since every information element is associated with a unique Element ID, a DMG STA that receives a Link Measurement Request/Report frame is therefore able to identify which optional element(s) the frame includes.

Figure 8:
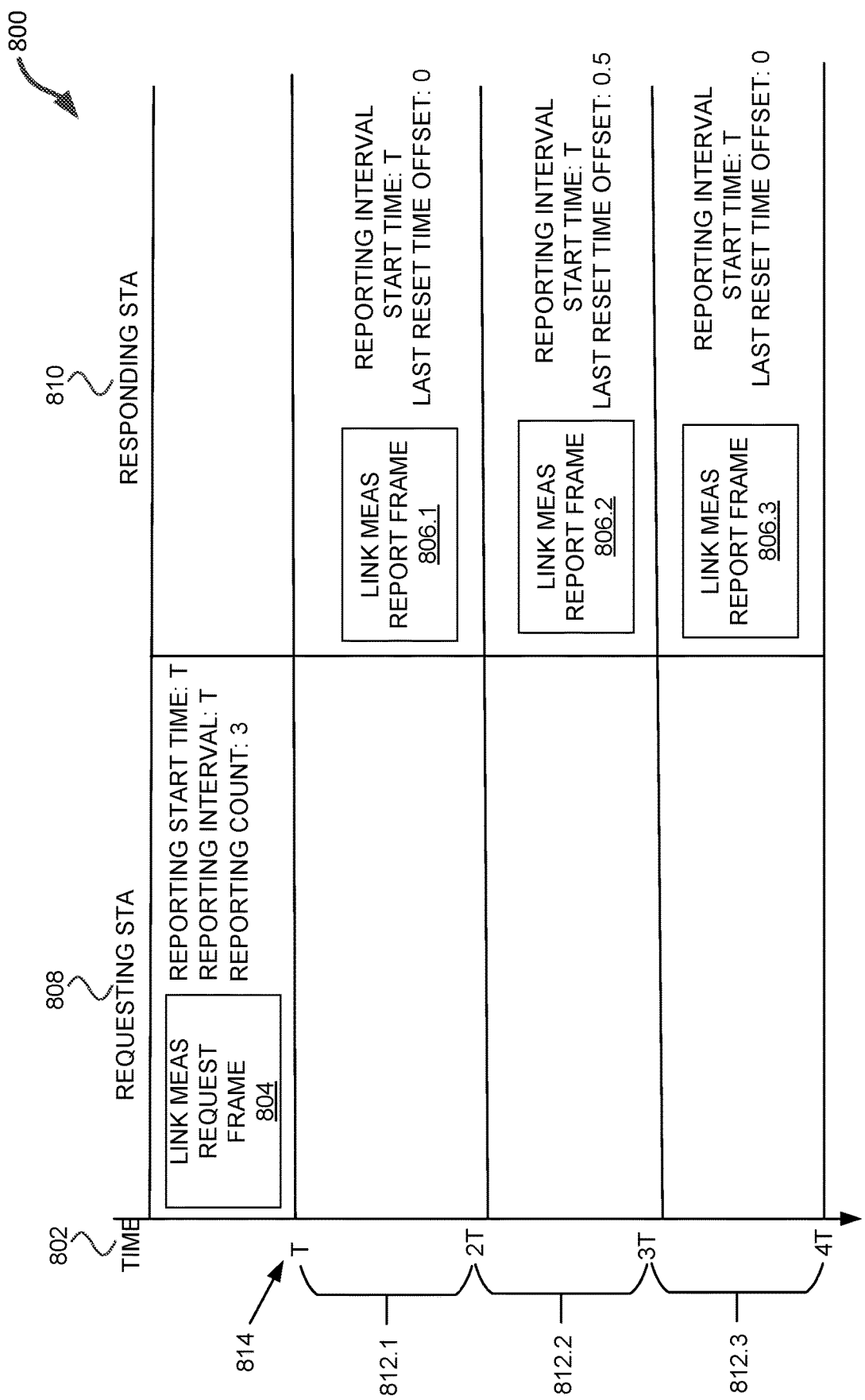
FIG. 8 illustrates a method for periodic unsolicited wireless link measurement reporting, in accordance with some embodiments.

FIG. 8 illustrates a method 800 for periodic unsolicited wireless link measurement reporting, in accordance with some embodiments. Illustrated in FIG. 8 is time 802, requesting STA 808, responding STA 810, intervals 812, and start time 814. Time 802 progresses in the downward direction. The requesting STA 808 may be an AP 502 or STA 504. The responding STA 810 may be a STA 504 or AP 502. The method 800 begins with the requesting STA 808 transmitting a link measurement request frame 804 to the responding STA 810. The link measurement request frame 804 may be a link measurement request frame 900.

The link measurement request frame 900 may include an extended link measurement element 912, e.g., 1100. The extended link measurement element 912 may include one or more subelements (e.g., optional subelements 1108). For example, an optional subelement 1108 may be a periodic report request subelement 1200. The report start time 1202 may indicate a time T. The report interval 1204 may indicate a time T. The report count 1206 may indicate a value of 3. Additional optional subelements 1108 may be included in the link measurement request frame 900, e.g., extended TPC configuration subelement 1300 and EDMG transmit power subelement 1400. The start time 814 may be the time indicated in the report start time 1202. The intervals 812 may be of a duration (e.g., T) indicated by the report interval 1204. The number of intervals 812, which is three (3) as illustrated, may be indicated by the value indicated by the report count 1206.

The link measurement request frame 900 may configure the responding STA 810 to report at the start of (or during) the first reporting interval indicated by the report start time 1202. The link measurement request frame 900 may configure the responding STA 810 to report at the start of (or during) each interval where the interval is a duration indicated by report interval 1204, which may be T as illustrated in FIG. 8. The link measurement request frame 900 may configure the responding STA 810 to report the number of times indicated in report count 1206.

Figure 10:
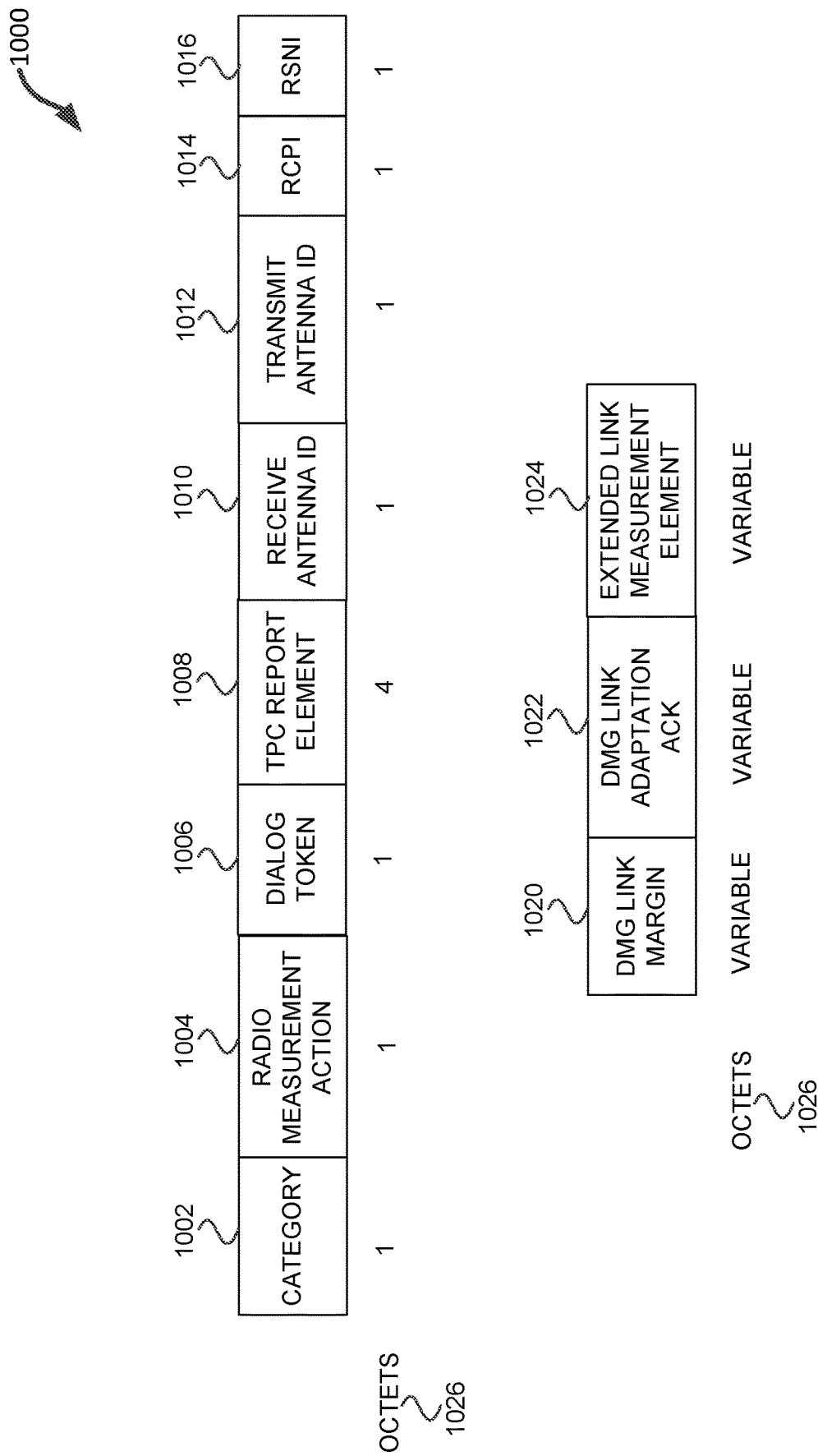
FIG. 10 illustrates a link measurement report frame, in accordance with some embodiments.

The link measurement report frames 806 may be link measurement report frames 1000 as illustrated in FIG. 10. The link measurement report frames 806 may be based on measurements taken by the responding STA 810 based on the subelements extended TPC configuration subelement 1300 and EDMG transmit power subelement 1400 received in a link measurement request frame 804 (e.g., 900). The responding STA 810 as illustrated takes measurements and transmits a link measurement report frame 806.1, 806.2, and 806.3, during each interval of T for the three times indicated in report count 1206.

The link measurement report frames 806 may include a periodic report subelement 1500, which may include an indication of report interval start time 1504 and/or statistics reset time offset 1506. As illustrated in FIG. 8, the report interval start time 1504 is set to indicate T in each of the three link measurement report frames 806. The statistics reset time offset 1506 may indicate 0.5 for link measurement report frame 806.2, which indicates the relative time offset, in microseconds, of the last event when the reset condition is met since the start of the corresponding reporting interval. Link measurement report frames 806.1 and 806.3 may or may not include a periodic report subelement 1500. The value of the statistics reset time offset 1506 (as illustrated in FIG. 8) is zero (0).

The link measurement request frame 804 (e.g., 900) may be encoded in a media access control service data unit (MSDU), MAC protocol data unit (MPDU) (or aggregate MDPU), and a physical layer (PHY) protocol data unit (PPDU). The link measurement report frame 806 (e.g., 1000) may be encoded in a MSDU, MPDU (or aggregate MDPU), and a PPDU.

Figure 9:
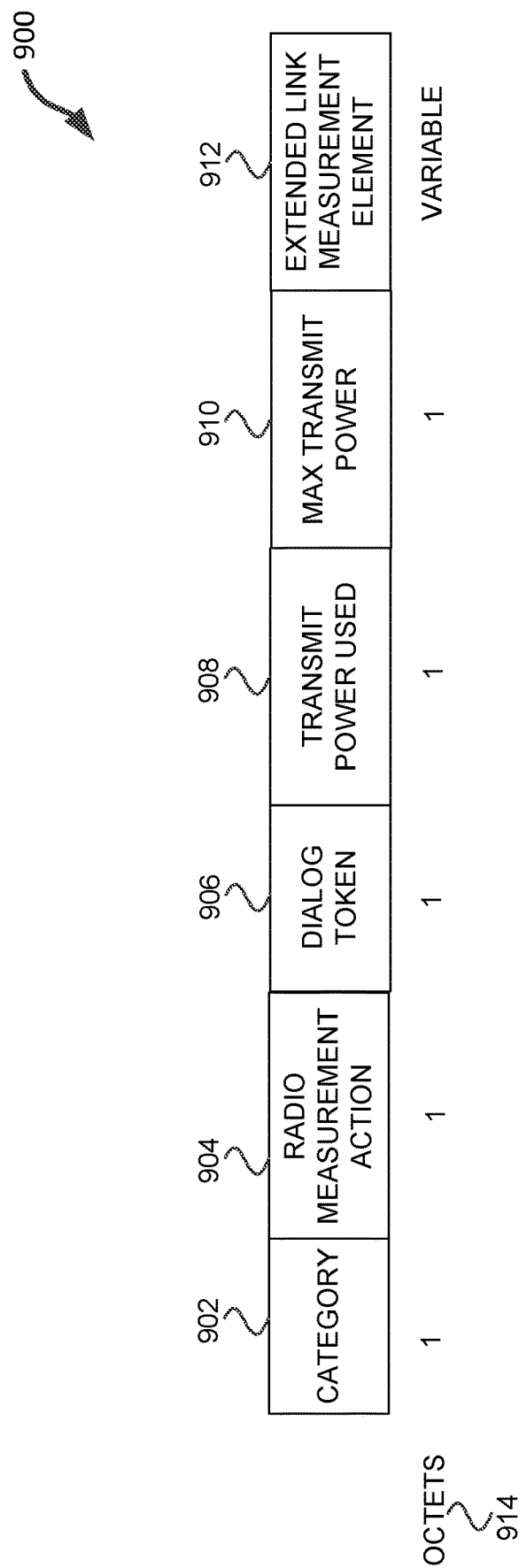
FIG. 9 illustrates a link measurement request frame, in accordance with some embodiments.

FIG. 9 illustrates a link measurement request frame 900, in accordance with some embodiments. Illustrated in FIG. 9 is category field 902, radio measurement action field 904, dialog token field 906, transmit power used field 908, maximum transmit power field 910, extended link measurement element field 912, and octets 914. The category field 902 is an indication of a type of link measurement request frame 900. The radio measurement action field 904 is an indication of a type of request for the link measurement request frame 900. The dialog token field 906 is set to a nonzero value chosen by the STA sending the request to identify the transaction. The transmit power used field 908 is set to the transmit power used to transmit the frame containing the link measurement request frame 900. The maximum transmit power field 910 provides the upper limit on the transmit power as measured at the output of the antenna connector to be used by the transmitting STA on its operating channel. The extended link measurement element field 912 is optional, and when present contains an extended link measurement element 1100. Octets 914 indicates a number of octets for each of the fields. In some embodiments, the link measurement request frame 900 may be termed an extended link measurement element.

FIG. 10 illustrates a link measurement report frame 1000, in accordance with some embodiments. Illustrated in FIG. 10 is category field 1002, radio measurement action field 1004, dialog token field 1006, TPC report element field 1008, receive antenna ID field 1010, transmit antenna ID field 1012, received channel power indicator (RCPI) field 1014, RSNI field 1016, DMG link margin field 1020, DMG link adaptation ACK field 1022, extended link measurement field 1024, and octets 1026. The category field 1002 is an indication of a type of link measurement report frame 1000. Radio measurement action field 1004 indicates a type action, e.g., radio measurement report, radio measurement request, link measurement report, link measurement request, neighbor measurement report, or neighbor measurement request. Dialog token field 1006 is set to the value of the dialog token field 906 in the last received corresponding link measurement request frame 900. TPC report element field 1008 contains transmit power and link margin information sent in response to a TPC. The receive antenna ID field 1010 contains the identifying number for the antenna(s) used to receive the corresponding link measurement request frame 900 or the last received frame from the requesting STA (e.g., AP 502) within 19 the corresponding report interval. The transmit antenna ID field 1012 contains identifying number for the antenna(s) used to transmit this link measurement report frame 1000.

Received channel power indicator (RCPI) field 1014 indicates the received channel power of the corresponding link measurement request frame 900 or the last received frame from the requesting STA (e.g., AP 502) within the corresponding report interval. RSNI field 1016 indicates the received signal-to-noise indication for the corresponding link measurement request frame 900 or the last received frame from the requesting STA (e.g., AP 502) within the corresponding report interval. DMG link margin field 1020 is optional, and when present, it contains a DMG link margin element (not illustrated). DMG link adaptation ACK field 1022 is optional, and when present, it contains a DMG link margin adaptation acknowledgment element. The extended link measurement element field 1024 is optional, and when present contains an extended link measurement element 1100. Octets 1026 indicates a number of octets for each of the fields.

Figure 11:
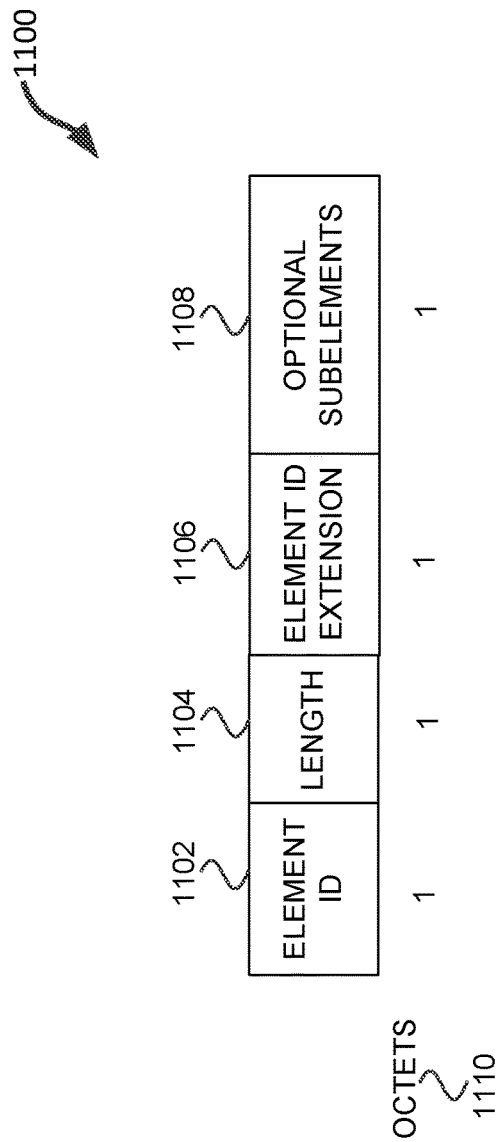
FIG. 11 illustrates an extended link measurement element, in accordance with some embodiments.

FIG. 11 illustrates an extended link measurement element 1100, in accordance with some embodiments. Illustrated in FIG. 11 is element ID 1102, length 1104, element ID extension 1106, optional subelements 1108, and octets 1110. The element ID 1102 and element ID extension 1106 may identify the element type. The length 1104 may indicate a length of the extended link measurement element 1100, in accordance with some embodiments.

TABLE 1

Optional Subelement IDs

| Subelement ID | Name | Extensible |
| --- | --- | --- |
| 0 | Periodic Report Request | Yes |
| 1 | Extended TPC Configuration | Yes |
| 2 | EDMG Transmit Power | Yes |
| 3 | Periodic Report | Yes |
| 4-255 | Reserved | Yes |

The optional subelements 1108 may indicate a type of optional subelement as indicated by Table 1. For example, optional subelements 1108 with a value of 0 may indicate a periodic report request subelement 1200, a value of 1 may indicate extended TPC configuration subelement (e.g., 1300), and a value of 2 may indicate an EDMG transmit power subelement (e.g., 1400). The extended link measurement element 1100 contains information used to solicit link measurement reports and is optionally included in link measurement request frame 900 and link measurement report frames 1000.

Figure 12:
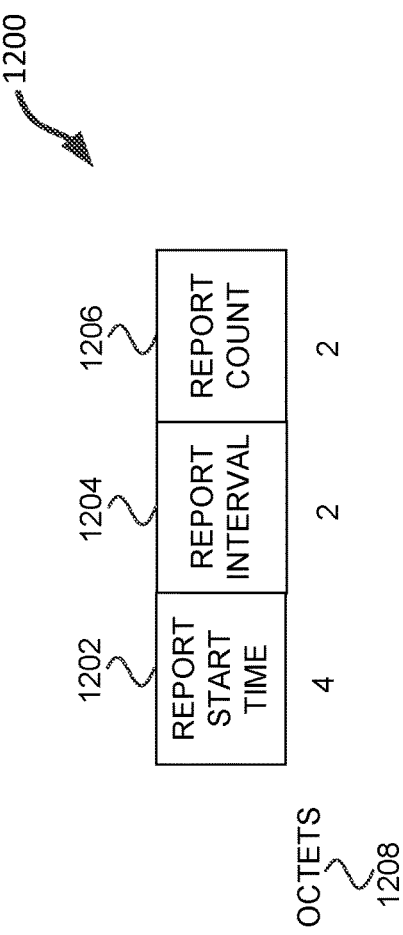
FIG. 12 illustrates a periodic report request subelement, in accordance with some embodiments.

FIG. 12 illustrates a periodic report request subelement 1200, in accordance with some embodiments. Illustrated in FIG. 12 is report start time subfield 1202, report interval subfield 1204, and report count subfield 1206. Report start time subfield 1202 indicates the lower 4 octets of the TSF timer at the start of the first reporting 21 interval. Report interval subfield 1204 indicates the interval of time, in microseconds, at which the responding STA (e.g., STA 504) needs to take measurements and send an unsolicited link measurement report frame 1000 to the requesting STA (e.g., AP 502). A value of zero for report interval subfield 1204 may be reserved. Report count subfield 1206 indicates the number of report intervals. A responding STA (e.g., STA 504) sends an unsolicited link measurement report frame 1000 to the requesting STA (e.g., AP 502) for every report interval. In some embodiments, a value zero for report count subfield 1206 is reserved.

Figure 13:
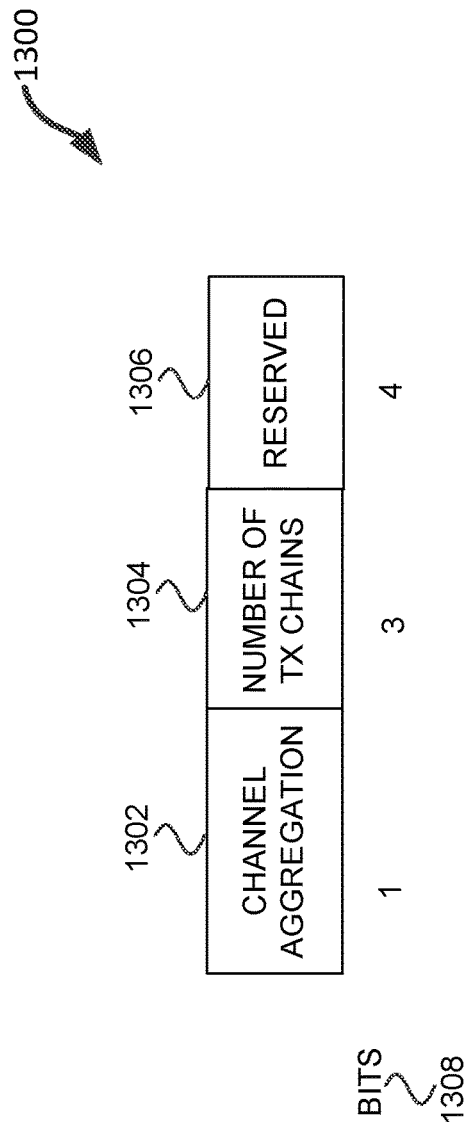
FIG. 13 illustrates an extended transmit power control (TPC) configuration subelement, in accordance with some embodiments.

FIG. 13 illustrates an extended transmit power control (TPC) configuration subelement 1300, in accordance with some embodiments. Illustrated in FIG. 13 is channel aggregation subfield 1302, number of transmit (TX) changes subfield 1304, reserved 1306, and bits 1308. In some embodiments, channel aggregation subfield 1302 is set to 1 to indicate that the PPDU containing the link measurement request frame 900 is transmitted over a 2.16+2.16 GHz or a 4.32+4.32 GHz channel and is set to 0 otherwise. Number of TX Chains subfield 1304 indicates the number of transmit chains used in the transmission of the PPDU containing the link measurement request frame 900. In some embodiments, if the channel aggregation subfield 1302 is 1, the number of TX chains subfield 1304 is an even number. The extended TPC configuration subelement 1300 contains information for EDMG transmit power control configuration and is optionally included in a link measurement request frame 900.

Figure 14:
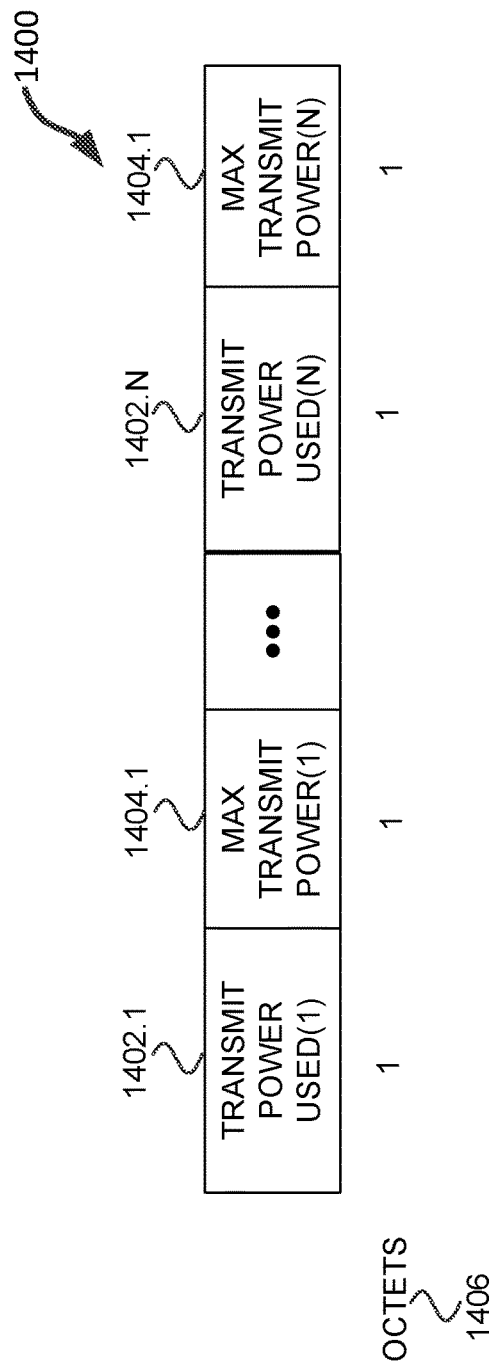
FIG. 14 illustrates an enhanced directional multi-gigabit (EDMG) transmit power subelement, in accordance with some embodiments.

FIG. 14 illustrates an enhanced directional multi-gigabit (EDMG) transmit power subelement 1400, in accordance with some embodiments. Illustrated in FIG. 14 is transmit power used (1) subfield 1402.1, maximum (max) transmit power (1) subfield 1404.1, through, transmit power (N) subfield 1402.N, and max transmit power subfield (N) 1404.N. Transmit Power used (i) field, $1 \leq i \leq N$, indicates the transmit power used in the transmit chain i to transmit the PPDU containing the link measurement request frame 900, as described. N represents the number of transmit chains of the STA (e.g., STA 504). Max Transmit Power (i) subfield, $1 \leq i \leq N$, indicates the upper limit on the transmit power of the transmit chain i measured at the output of the antenna connector to be used by the transmitting STA (e.g., STA 504) on its operating channel. The EDMG transmit power subelement 1400 contains information for transmit power in link measurement and is optionally included in a link measurement request frame 900.

Figure 15:
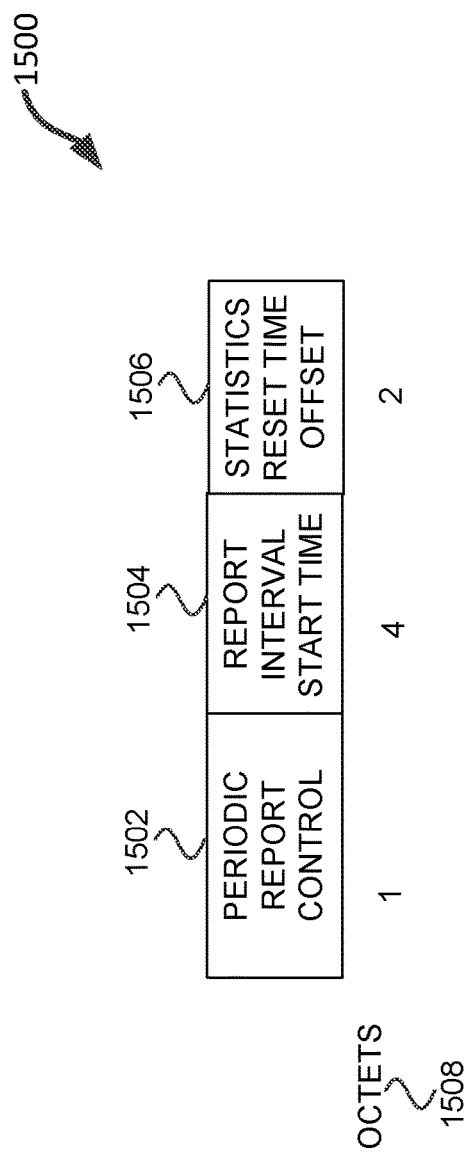
FIG. 15 illustrates a periodic report subelement, in accordance with some embodiments.

FIG. 15 illustrates a periodic report subelement 1500, in accordance with some embodiments. Illustrated in FIG. 15 is periodic report control subfield 1502, report interval start time subfield 1504, statistics reset time offset subfield 1506, and octets 1508. Octets 1508 indicates a number of octets in the subfields. The periodic report subelement 1500 contains information in response to a periodic link measurement request and is optionally included in a link measurement report frame 1000.

Figure 16:
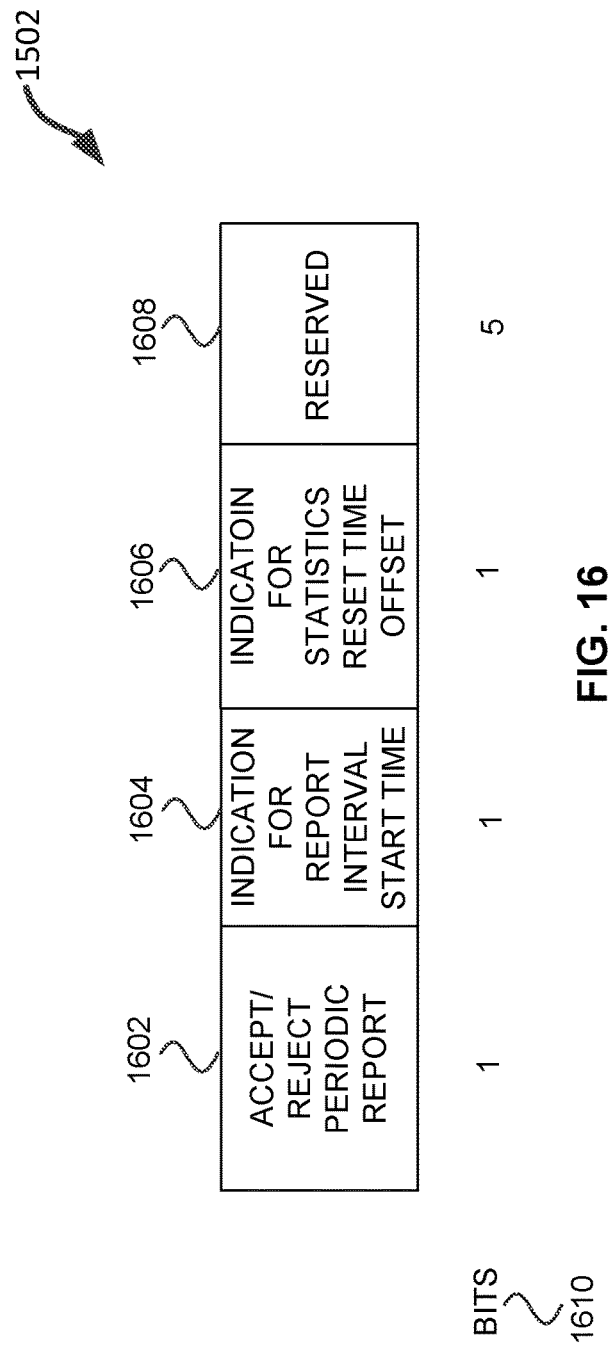
FIG. 16 illustrates a period report control field, in accordance with some embodiments.

Periodic report control field 1502 is illustrated in FIG. 16. Indication for report interval start time subfield 1504 is optional, and if present, it indicates the lower 4 octets of the TSF timer at the start of the report interval of the corresponding link measurement report frame 1000. The statistics reset time offset field 1506 is optional, and if present, it indicates the relative time offset, in microseconds, of the last event when the reset condition is met since the start of the corresponding reporting interval.

FIG. 16 illustrates a period report control field 1502, in accordance with some embodiments. Illustrated in FIG. 16 is accept/reject periodic report subfield 1602, indication for report interval start time subfield 1604, indication for statistics reset time offset subfield 1606, reserved 1608, and bits 1610.

In accordance with some embodiments, accept/reject periodic report subfield 1602 is set to 1 if the responding STA (e.g., STA 504) accepts periodic report, and is set to 0 if the responding STA rejects periodic report. Indication for statistics reset time offset subfield 1606 is set to 1 if the link measurement report frame 1000 contains the statistics reset time offset field 1506 and set to 0 otherwise. Indication for statistics reset time offset subfield 1606 is set to 1 if the link measurement report frame 1000 contains the statistics reset time offset field 1506. It is set to 0 otherwise.

Periodic report control field 1600 contains indications of whether the responding STA (e.g., STA 504) accepts or rejects the periodic link measurement request 900, and whether the link measurement report frame 1000 includes optional fields used for periodic link measurement reports. Reserved 1608 indicates the bits of reserved 1608 are reserved for future use. Bits 1610 indicates a number of bits in each subfield.

Some embodiments do not provide an ability to include report interval start time subfield 1504 and statistics reset time offset subfield 1506. These two subfield (1504, 1506) provide information that may be important since some reset conditions, such as packet queueing (local to STA 504), or channel access in CSMA case, packet loss etc., make the reset time at receiver (e.g., AP 502) unknown to transmitter (e.g., STA 504). In these cases, the two subfields (1504, 1506) convey the information of these reset events.

Figure 17:
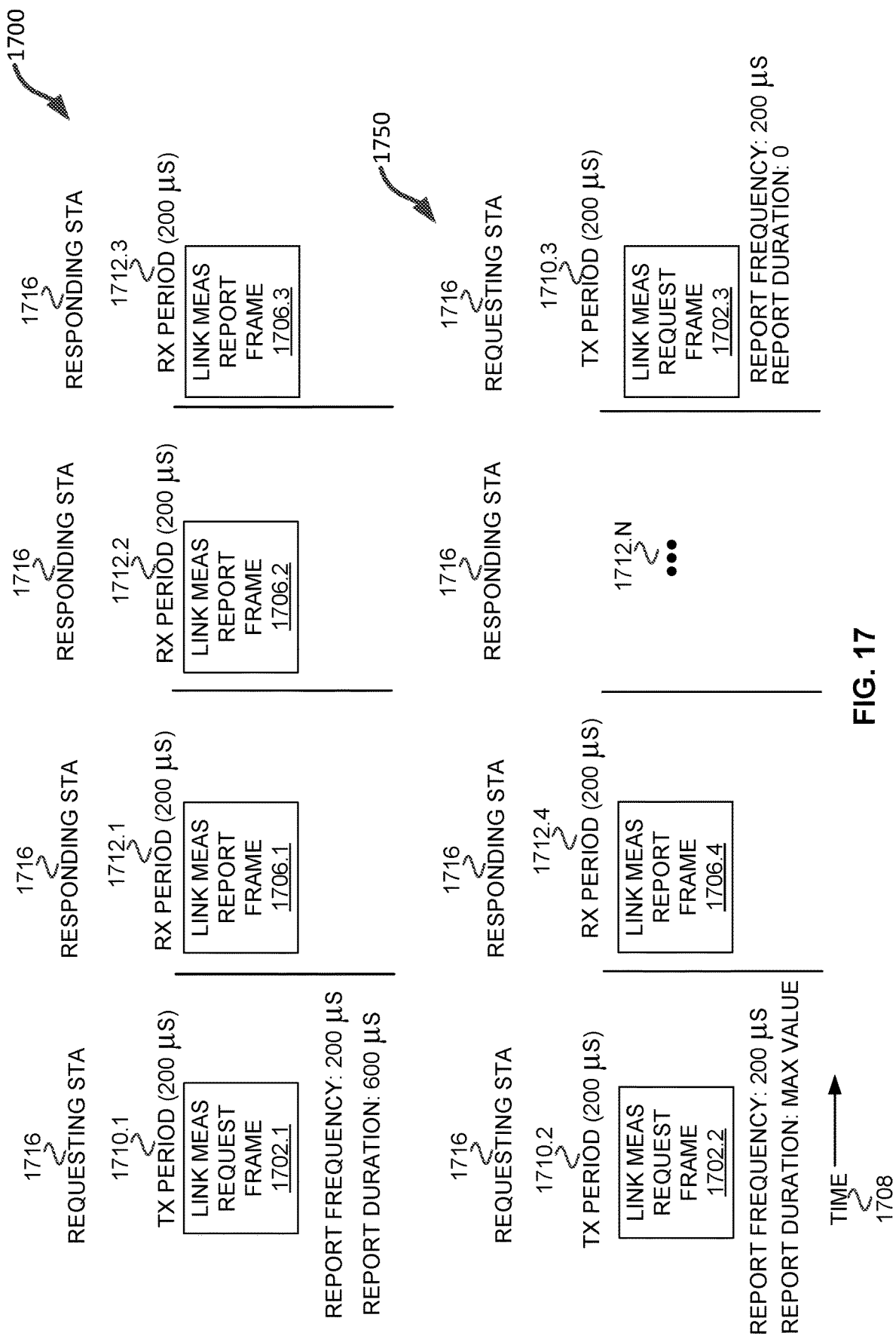
FIG. 17 illustrates methods for periodic unsolicited wireless link measurement reporting, in accordance with some embodiments.

FIG. 17 illustrates methods 1700 and 1750 for periodic unsolicited wireless link measurement reporting, in accordance with some embodiments. Illustrated in FIG. 17 is link measurement (meas) request frames 1702, link measurement report frames 1706, time 1708, transmit (TX) period 1710, receive (RX) period 1712, requesting STA 1716, and responding STA 1718. Time 1708 indicates time progresses to the right in FIG. 17. TX Period 1710 and RX period 1712 indicate periods of time of 200 μs as illustrated. Requesting STA 1716 is a STA that is requesting periodic reporting, e.g., AP 502 (FIG. 8). Responding STA 1716 is a STA that is responding to a request for periodic reporting, e.g., STA 504 (FIG. 8).

The method 1700 begins with requesting STA 1716 transmitting link measurement request frame 1702.1 (e.g., 900). The link measurement request frame 1702.1 includes fields that indicate that the report frequency is 200 μs and that the report duration is 600 μs. The method 1700 continues at RX period 1712.1 with the responding STA 1716 transmitting link measurement report frame 1706.1. The method 1700 continues with responding STA 1716 transmitting link measurement report frame 1706.2, and then link measurement report frame 1706.3. The responding STA 1716 transmits three link measurement report frames 1706.1, 1706.2, and 1706.3, in response to the link measurement request frame 1702.1, where the three link measurement report frames 1706.1, 1706.2, and 1706.3, are transmitted 200 μs apart and there are three because of the report duration equaling 600 μs. The responding STA 1716 stops transmitting link measurement report frames 1706 after the third frame is transmitted.

The method 1750 begins with the requesting STA 1716 transmitting link measurement request frame 1702.2 with report frequency 200 μs and a maximum (max) value for the report duration. A maximum value for the report duration may indicate the responding STA 1716 is to keep transmitting link measurement report frames 1706 each period of 200 μs until receiving a frame indicating to stop transmitting. The method 1750 continues with responding STA 1716 transmitting link measurement report frame 1706.4 and continuing to transmit link measurement report frames 1706 through N until receiving a link measurement request frame 1702.3 that indicates a report duration of zero (0) that indicates the responding STA 1716 is to stop transmitting link measurement report frames 1706.4.

Figure 18:
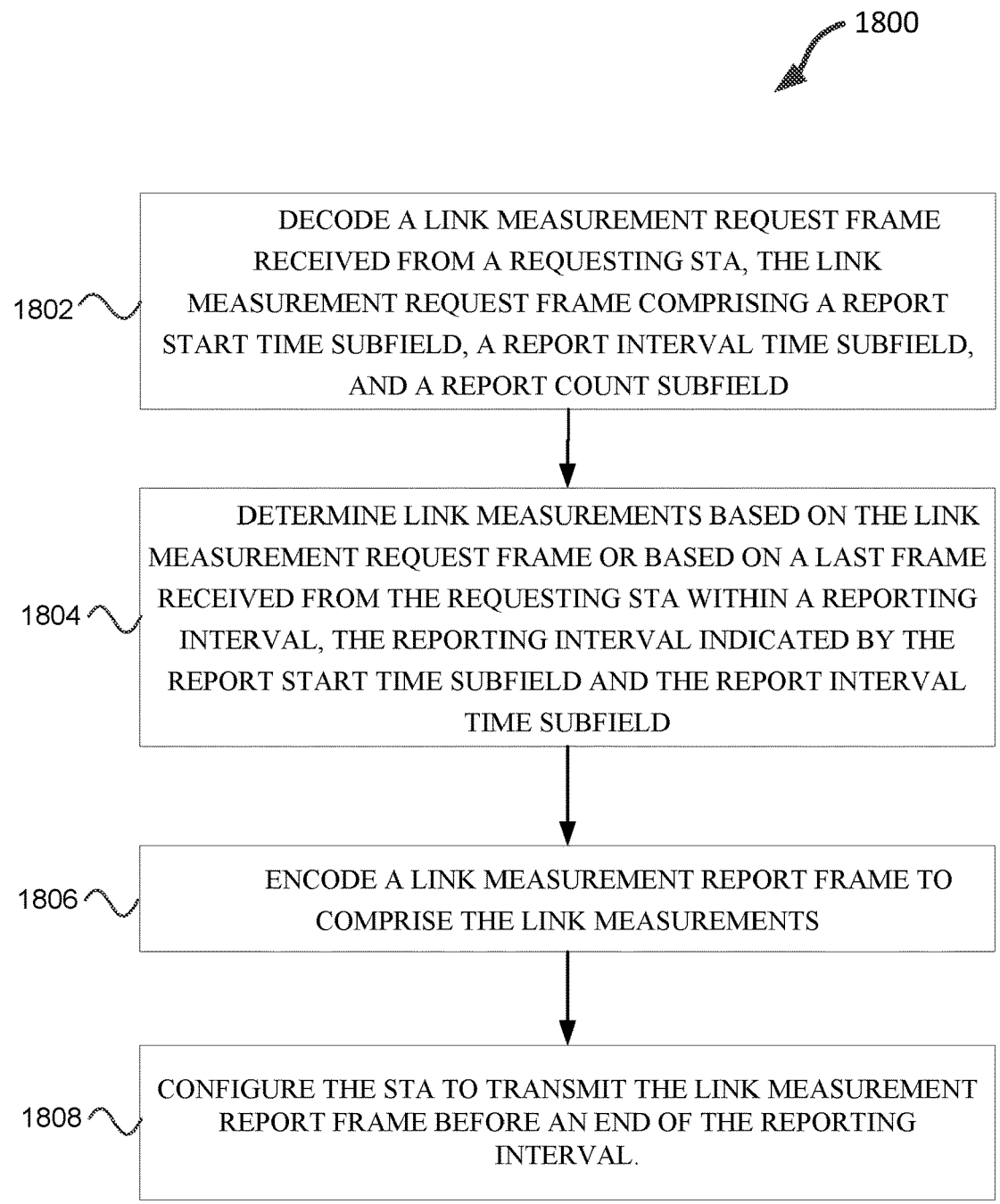
FIG. 18 illustrates method for periodic unsolicited wireless link measurement reporting, in accordance with some embodiments.

FIG. 18 illustrates method 1800 for periodic unsolicited wireless link measurement reporting, in accordance with some embodiments. The method 1800 begins at operation 1802 with decoding a link measurement request frame received from a requesting STA, the link measurement request frame comprising a report start time subfield, a report interval time subfield, and a report count subfield. For example, responding STA 810 (FIG. 8) may decode link measurement request frame 804 as disclosed in conjunction with FIG. 8.

The method 1800 continues at operation 1804 with determining link measurements based on the link measurement request frame or based on a last frame received from the requesting STA within a reporting interval, the reporting interval indicated by the report start time subfield and the report interval time subfield. For example, responding STA 810 may determine link measurements based on the link measurement request frame 804 or a subsequent frame the requesting STA 808 transmits as disclosed in conjunction with FIG. 8.

The method 1800 continues at operation 1806 with encoding a link measurement report frame to comprise the link measurements. For example, responding STA 810 may encode link measurement report frame 806.1, 806.2, or 806.3, as disclosed in conjunction with FIG. 8. The method 1800 configure the STA to transmit the link measurement report frame before an end of the reporting interval. For example, an apparatus of responding STA 810 may configure the responding STA 810 to transmit the link measurement report frame 806.1 before time 2T arrives or during interval 812.1. Method 1800 may be performed in a different order. Method 1800 may include one or more additional operations. One or more of the operations of method 1800 may be optional.

Figure 19:
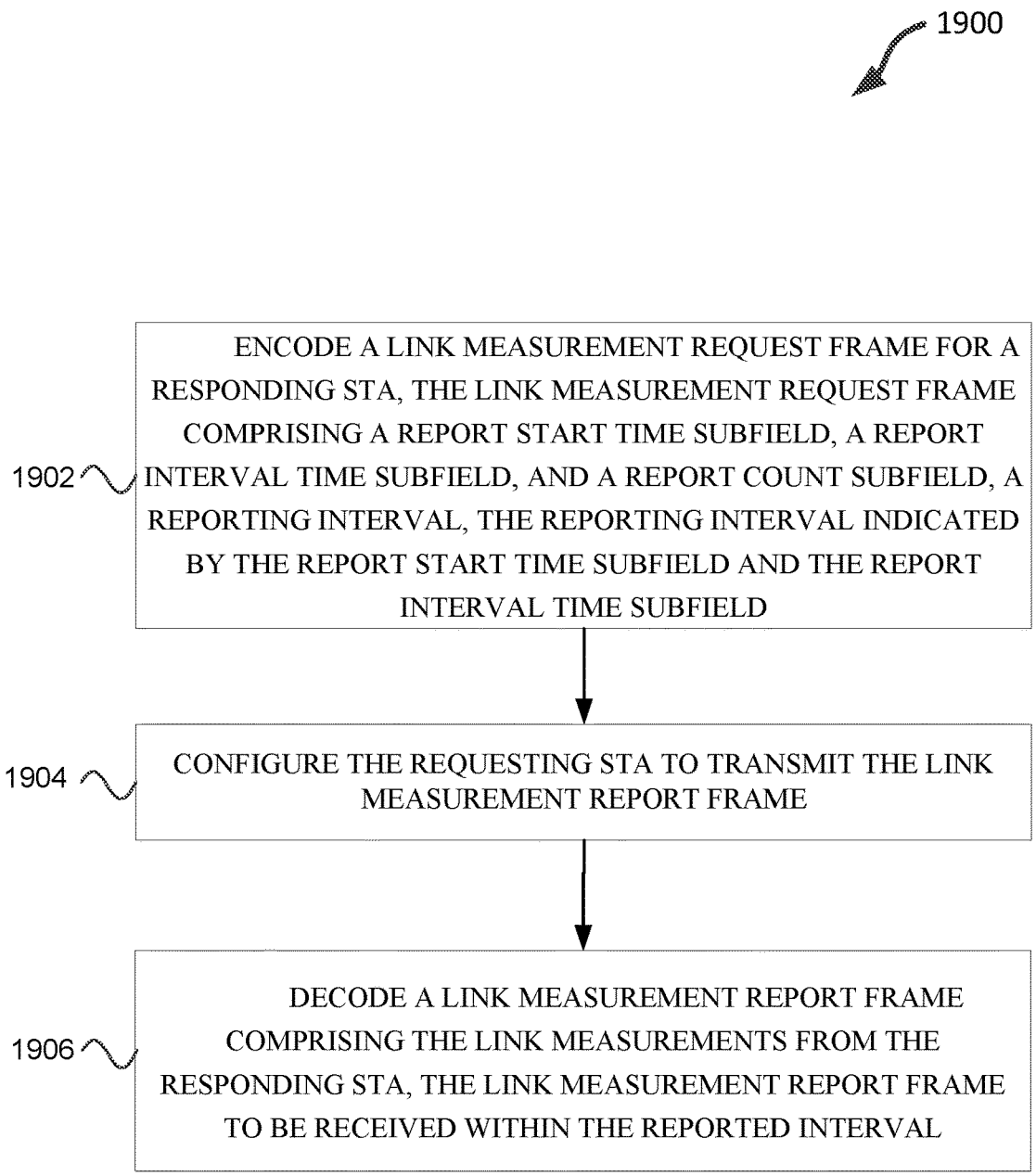
FIG. 19 illustrates method for periodic unsolicited wireless link measurement reporting, in accordance with some embodiments.

FIG. 19 illustrates method 1900 for periodic unsolicited wireless link measurement reporting, in accordance with some embodiments. The method 1900 begins at operation 1902 with encode a link measurement request frame for a responding STA, the link measurement request frame comprising a report start time subfield, a report interval time subfield, and a report count subfield, a reporting interval, the reporting interval indicated by the report start time subfield and the report interval time subfield. For example, requesting STA 808 may encode link measurement request frame 804 as disclosed in conjunction with FIG. 8.

Method 1900 may continue at operation 1904 with configuring the requesting STA to transmit the link measurement request frame to a responding STA, where the link measurement request frame configures the responding STA to transmit a link measurement report frame for each interval indicated by the report count subfield. For example, an apparatus of requesting STA 808 may configure requesting STA 808 to transmit the link measurement request frame 804.

Method 1900 may continue at operation 1906 with decoding a link measurement report frame, where the link measurement frame is received at a time indicated by the report start time subfield and a time indicated by the report interval time subfield, and where the link measurement report comprises link measurements based on a frame transmitted to the responding STA from the requesting STA. For example, requesting STA 808 receives link measurement report frame 806.1 at a time based on time 2T, link measurement report frame 806.2 at a time based on time 3T, and link measurement report frame 806.3 based on time 4T.

Method 1900 may be performed in a different order. Method 1900 may include one or more additional operations. One or more of the operations of method 1900 may be optional.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a responding station (STA), the apparatus comprising:
   memory; and
   processing circuitry coupled to the memory, the processing circuitry configured to:
      decode, from a requesting STA, a link measurement request frame received from a requesting STA, the link measurement request frame comprising a periodic report request subelement, the periodic report request subelement comprising:
      a report start time subfield, a report interval time subfield, and a report count subfield, wherein the report start time subfield indicates a start of a first report interval with a lower four (4) octets of a timing synchronization function (TSF) timer, the report interval time subfield indicates an interval of time, in microseconds, at which the responding STA is to take measurements and send an unsolicited link measurement report frame to the requesting STA, and the report count subfield indicates a number of reporting intervals, and wherein the link measurement request frame indicates the STA is to send at least one unsolicited link measurement report during each of the number of report intervals;
      take link measurements within the first report interval, the link measurements based on signals received from the requesting STA;
      encode an unsolicited link measurement report frame to comprise the link measurements and a periodic report subelement, the periodic report subelement comprising a periodic report control subfield, a report interval start time subfield, and a statistics reset time offset subfield, wherein the periodic report control subfield indicates whether the STA accepts to transmit periodic reports as indicated in the link measurement request frame, indicates whether the report interval start time subfield comprises a valid value, and indicates whether the statistics reset time subfield comprises a valid value; and
      configure the STA to transmit the unsolicited link measurement report frame, to the requesting STA, before an end of the first report interval.

2. The apparatus of claim 1, wherein the processing circuitry is further configured to:
   determine additional link measurements from an additional last received frame from the requesting STA received within an additional reporting interval, the additional reporting interval indicated by the report start time subfield, the report interval time subfield, and a reporting interval number of the additional reporting interval;
   encode an additional unsolicited link measurement report frame to comprise the additional link measurements; and configure the STA to transmit the additional unsolicited link measurements before an end of the additional reporting interval.

3. The apparatus of claim 1, wherein if the report interval start time subfield indicates the valid value, the report interval start time subfield indicates a lower four (4) octets of a timing synchronization function (TSF) timer to indicate a start of a report interval of the link measurement report frame, and if the statistics reset time subfield indicates the valid value, the statistics reset time subfield indicates a relative time offset in microseconds of a last event when a reset condition was met since a start of the first reporting interval.

4. The apparatus of claim 1, wherein the unsolicited link measurement request frame comprises an extended link measurement element, the extended link measurement element comprising an element identification (ID) field, a length field, an element ID extension, and a periodic request subelement, wherein the element ID field and the element ID extension indicate a type of subelement as the periodic report request subelement, and wherein the periodic report request subelement comprises the report start time subfield, the report interval time subfield, and the report count subfield.

5. The apparatus of claim 1, wherein the unsolicited link measurement request frame further comprises an enhanced directional multi-gigabit (EDMG) transmit power subelement, the EDMG transmit power subelement comprising for each of i transmit chains, an indication of a transmit power used in the transmit chain to transmit a physical layer (PHY) protocol data unit (PPDU) comprising the link measurement request frame and a maximum transmit power of the transmit chain.

6. The apparatus of claim 1, wherein the unsolicited link measurement frame is encoded in a physical layer (PHY) protocol data unit (PPDU), and wherein the link measurement request frame comprises an extended transmit power control (TPC) configuration subelement, the extended TPC configuration subelement comprising a channel aggregation field, a number of transmit (TX) chains field, and a reserved field, wherein the channel aggregation field indicates whether the PPDU is transmitted over a 2.16+2.16 GHz or 4.32+4.32 GHz channel or not, and wherein the number of TX chains field indicates a number of transmit chains used in the transmission of the PPDU.

7. The apparatus of claim 1, further comprising a direct conversion mixer, the direct conversion mixer configured to directly downconvert radio frequency (RF) signals to baseband signals,
wherein the processing circuitry is configured to decode the baseband signals, the baseband signals including the link measurement request frame.

8. The apparatus of claim 1, further comprising a super-heterodyne mixer, the super-heterodyne mixer configured to downconvert RF signals to intermediate frequency signals prior to generation of baseband signals,
wherein the processing circuitry is configured to decode the baseband signals, the baseband signals including the link measurement request frame.

9. The apparatus of claim 1, further comprising transceiver circuitry coupled to the processing circuitry, the transceiver circuitry coupled to two or more patch antennas for receiving signalling in accordance with a multiple-input multiple-output (MIMO) technique.

10. The apparatus of claim 1, further comprising transceiver circuitry coupled to the processing circuitry, the transceiver circuitry coupled to two or more microstrip antennas for receiving signalling in accordance with a multiple-input multiple-output (MIMO) technique.

11. The apparatus of claim 1, wherein the STA and the requesting STA are each configured to operate in accordance with one or more from the following group: Institute of Electrical and Electronic Engineers (IEEE) 802.11ad, IEEE 802.11ay, and IEEE 802.11.

12. A non-transitory computer-readable storage medium that stores instructions for execution by one or more processors of an apparatus of a station (STA), the instructions to configure the one or more processors to:
decode, from a requesting STA, a link measurement request frame received from a requesting STA, the link measurement request frame comprising a periodic report request subelement, the periodic report request subelement comprising: a report start time subfield, a report interval time subfield, and a report count subfield, wherein the report start time subfield indicates a start of a first report interval with a lower four (4) octets of a timing synchronization function (TSF) timer, the report interval time subfield indicates an interval of time, in microseconds, at which the responding STA is to take measurements and send an unsolicited link measurement report frame to the requesting STA, and the report count subfield indicates a number of reporting intervals, and wherein the link measurement request frame indicates the STA is to send at least one unsolicited link measurement report during each of the number of report intervals;
take link measurements within the first report interval, the link measurements based on signals received from the requesting STA;
encode an unsolicited link measurement report frame to comprise the link measurements and a periodic report subelement, the periodic report subelement comprising a periodic report control subfield, a report interval start time subfield, and a statistics reset time offset subfield, wherein the periodic report control subfield indicates whether the STA accepts to transmit periodic reports as indicated in the link measurement request frame, indicates whether the report interval start time subfield comprises a valid value, and indicates whether the statistics reset time subfield comprises a valid value; and
configure the STA to transmit the unsolicited link measurement report frame, to the requesting STA, before an end of the first report interval.

13. The non-transitory computer-readable storage medium of claim 12, wherein the instructions further configure the one or more processors to:
determine additional link measurements from an additional last received frame from the requesting STA received within an additional reporting interval, the additional reporting interval indicated by the report start time subfield, the report interval time subfield, and a reporting interval number of the additional reporting interval;
encode an additional unsolicited link measurement report frame to comprise the additional link measurements; and
configure the STA to transmit the additional link measurements before an end of the additional reporting interval.

14. An apparatus of a requesting station (STA), the apparatus comprising:
memory; and processing circuitry coupled to the memory, the processing circuitry configured to:
encode a link measurement request frame for a responding STA, the link measurement request frame comprising a report start time subfield, a report interval time subfield, and a report count subfield, wherein the report start time subfield indicates a start of the reporting interval with a lower four (4) octets of a timing synchronization function (TSF) timer, the report interval time subfield indicates a duration of the reporting interval in microseconds, and the report count subfield indicates a number of reporting intervals, and wherein a first reporting interval is indicated by the report start time subfield and the report interval time subfield;
configure the requesting STA to transmit the link measurement report frame; and
decode a link measurement report frame comprising the link measurements from the responding STA, the link measurements being of signals transmitted by the requesting STA and wherein the link measurement report frame is to be received within the first reported interval, the link measurement report further comprising a periodic report subelement, the periodic report subelement comprising a periodic report control subfield, a report interval start time subfield, and a statistics reset time offset subfield, wherein the periodic report control subfield indicates whether the STA accepts to transmit periodic reports as indicated in the link measurement request frame, indicates whether the report interval start time subfield comprises a valid value, and indicates whether the statistics reset time subfield comprises a valid value.

15. The apparatus of claim 14, wherein the processing circuitry is further configured to:
decode an additional unsolicited link measurement report frame to comprise additional link measurements from the responding STA, the additional link measurement report frame to be received at a time based on an additional reporting interval, the additional reporting interval indicated by the report start time subfield, the report interval time subfield, and a reporting interval number of the additional reporting interval.

16. The apparatus of claim 14, wherein the link measurements are based on the link measurement request frame.

17. The apparatus of claim 1 wherein the processing circuitry is further configured to:
before the in response to, send at least one additional unsolicited link measurement report frame to the requesting STA during each of the number of reporting intervals after the first reporting interval.

18. The apparatus of claim 14 wherein the processing circuitry is further configured to:
decode at least one additional unsolicited link measurement report frame during each of the number of reporting intervals after the first reporting interval.

19. The apparatus of claim 1 wherein the processing circuitry is further configured to:
in response to a determination that a report interval number is equal to the number of report intervals indicated by the report count subfield, determine to stop taking link measurements.

* * * * *